United States Patent
Twerdochlib

(10) Patent No.: US 7,379,632 B1
(45) Date of Patent: May 27, 2008

(54) FIBER OPTIC BRAGG GRATING STRAIN GAUGE FOR APPLICATION ON STRUCTURES WITH COMPLIANT SURFACE COVERING

(75) Inventor: Michael Twerdochlib, Oviedo, FL (US)

(73) Assignee: Siemens Power Generation, Inc., Orlando, FL (US)

( * ) Notice: Subject to any disclaimer, the term of this patent is extended or adjusted under 35 U.S.C. 154(b) by 0 days.

(21) Appl. No.: 11/711,824

(22) Filed: Feb. 27, 2007

(51) Int. Cl.
*G02B 6/34* (2006.01)

(52) U.S. Cl. .......................................... 385/13; 385/37

(58) Field of Classification Search ............... None
See application file for complete search history.

(56) References Cited

U.S. PATENT DOCUMENTS

| | | |
|---|---|---|
| 5,680,489 A | 10/1997 | Kersey |
| 6,498,415 B1 | 12/2002 | Emery |
| 6,587,188 B2 | 7/2003 | Gleine et al. |
| 6,636,041 B2 | 10/2003 | Arz et al. |
| 6,721,470 B2 | 4/2004 | Bosselmann et al. |
| 6,807,325 B1 | 10/2004 | Kraemmer et al. |
| 6,923,048 B2 | 8/2005 | Willsch et al. |
| 2007/0193362 A1 * | 8/2007 | Ferguson ..................... 73/800 |

FOREIGN PATENT DOCUMENTS

JP         2005-91151 A  *  4/2005

* cited by examiner

*Primary Examiner*—Rodney Bovernick
*Assistant Examiner*—Mike Stahl

(57) ABSTRACT

An optical measurement device for measuring strain related to deformation of a deformable surface of a component. The optical measurement device includes a fiber tension structure including opposing longitudinal end sections attached to the deformable surface. An optical fiber is tensioned by the fiber tension structure and includes a section defining a Bragg grating. The fiber tension structure includes a displaceable portion for forming a structural break between the longitudinal end sections where the fiber tension structure separates to form a gap between the first and second longitudinal end sections. The longitudinal end sections are movable independently of each other after formation of the structural break in the fiber tensioning structure.

20 Claims, 3 Drawing Sheets

FIBER OPTIC BRAGG GRATING STRAIN GAUGE FOR APPLICATION ON STRUCTURES WITH COMPLIANT SURFACE COVERING

FIELD OF THE INVENTION

The present invention relates generally to an optical measurement device for application to surfaces having a compliant surface covering and, more particularly, to a fiber optic Bragg grating strain gauge for performing strain measurements of a structure covered with a compliant surface covering.

BACKGROUND OF THE INVENTION

Strain gauges provide an inexpensive, high-performance means for measuring mechanical vibration on the surface of a structure, such as in an application to monitor fatigue and/or predict failure of the structure. In a conventional strain gauge, a thin film with an embedded electric resistance wire path is bonded to the surface of the structure at a location where the surface strain is being measured. The strain gauge film is compliant to the surface strain produced in the structure, causing the electrical resistance of the wire path to change in proportion to the surface strain. While electrical strain gauges operate satisfactorily in many applications, electrical strain gauges may not provide accurate strain information in applications involving high electric potential, such as in a strain measurement application in an electrical generator. Also, resistive type strain gauges require electrical conducting wires that could cause arcing to ground if they are deployed on a structure that is at a high voltage.

An electrical generator used in the field of electrical power generation includes a stator winding having a large number of conductor bars that are pressed into slots in a base body, in particular, a laminated stator core or a rotor body. Such an electrical generator represents a very expensive and long-term investment. Its failure not only endangers the power equipment itself but may also result in very severe service reduction due to the down time associated with repair. To avoid such a condition, increasing use is being made of a diagnosis system, which may, for example, include an optical measurement device, for early identification of defects. The diagnosis system furthermore allows a higher utilization level, making the power equipment more financially viable.

The Bragg grating strain gauge is commonly used in an optical measurement device. The Bragg grating strain gauge generally comprises an optical fiber with a diffraction grating pattern located directly within the optical fiber. The diffraction grating reflects a specific wavelength of light depending on the grating line spacing. If tension in the grating causes the optical fiber to stretch, the Bragg grating spacing is increased and the wavelength of the reflected light is increased proportionately.

The Bragg grating optical sensor may comprise a plurality of Bragg gratings located serially along a single optical fiber. Up to one hundred Bragg grating strain gauges may be placed along the length of the optical fiber. Each of the strain gauges has a unique spacing to reflect light at a wavelength that is unique to the particular strain gauge. For example, the spacing of diffraction lines in the Bragg gratings of each successive strain gauge may be incremented by 5 nm in reflective wavelength, so as not to overlap with the wavelength of any other strain gauge as the measured strain at each site slightly shifts the reflective wavelength of each Bragg grating. Each Bragg grating is assigned a frequency (or wavelength) band as determined by its grating spacing. Strain causes the Bragg grating to reflect (i.e., not transmit) the laser light so that the laser light within this band is shifted slightly, but is still within the band. A laser providing light to the optical fiber may be swept 500 nm at a 2 KHz repeat or sampling rate to cause each of the Bragg gratings to reflect its light sequentially. Each time the laser frequency is swept, and thus passes through the band of the grating, the light is reflected at a slightly different frequency (or wavelength), dependent on the strain experienced at this point. The exact laser light wavelength at which each Bragg grating reflects light corresponds to the stress at each measured site. Each Bragg grating is thus sampled at 2 KHz, resulting in a resolution of vibration measurement to 1 KHz. In a typical application, a second Bragg grating is included in each strain sensor, at the site of the strain sensing Bragg grating, to correct for temperature. A temperature change results in an apparent steady state strain in the fiber due to thermal expansion of the Bragg grating. This does not affect the dynamic vibration measurement, but will affect the steady state strain measurement. The dynamic vibration strain is thus biased by the steady state stress, and can affect the ultimate failure of the structure.

An example of a Bragg grating measurement system, including an operating device for providing a laser light source and an analyzer to analyze reflected light from a plurality of Bragg gratings at different locations, is described in U.S. Pat. No. 6,636,041, which patent is incorporated herein by reference. It should be noted that, in an alternative measurement system, the light transmitted past the Bragg grating may be analyzed, where the Bragg grating causes a notch in the received light at the frequency (or wavelength) of the Bragg grating.

In applications in which strain must be measured in the presence of a strong electrical field, such as at sites along a generator stator bar, the Bragg grating strain gauge is preferred over electrical or resistive strain gauges, in that the Bragg grating strain gauge is unaffected by the electrical field. However, application of the Bragg grating strain gauge differs from the electrical strain gauge in that the small diameter optical fiber containing the Bragg grating cannot be placed into compression by the strain at the site. Accordingly, the optical fiber must be pre-stressed or tensioned, where the optical fiber is generally under tension at all times, such that any increase or decrease of strain at the site will increase or decrease the stress in the optical fiber. The tension or pre-stress applied to the optical fiber may also be used to fine tune the frequency band of the Bragg grating.

As may be seen with reference to FIGS. 7 and 8, the present Bragg strain gauge technology, depicted by the strain gauge 8, tensions an optical fiber 10 at each Bragg grating site by placing the optical fiber 10 through a small stainless steel fiber tension structure 12. The fiber tension structure includes a window 14 through which the optical fiber 10 passes and within which the Bragg grating portion 16 is located. Before the optical fiber 10 is fastened to the fiber tension structure 12, the fiber 10 is stretched to place it in tension, and it is then cemented to the fiber tension structure 12 to maintain the tension within the fiber 10. The fiber tension structure 12 is then attached, such as by spot welding or spot cementing 18, to the metal surface 20 of a generator stator bar 22.

In certain applications, the metal generator stator bars, may be provided with a compliant material covering, i.e., an insulating ground wall, where "compliant covering" refers to a cover structure whose movement is controlled by thermal expansion and vibrating movement of the underlying metal stator bar. For example, referring to FIG. 9, in which a compliant cover structure 24 is attached to the metal generator stator bar 22, the cover structure 24 will substantially move with the stator bar 22 during thermal expansion and vibration, as is illustrated by the displacement d. In such applications, when the fiber tension structure of an optical sensor is attached to the compliant covering, the fiber tension structure will locally dominate the movement of the compliant insulating ground wall, such that the resulting strain measurement is considerably smaller than that which would exist at the measurement site if the fiber tensioning structure were not present.

In addition, it may be noted that when forces normal to the stator bar surface, such as vibrational forces, are applied to the stator bar causing it to flex, the strain at the stator bar surface is geometrically amplified by the thickness of the insulating ground wall. The ground wall effectively acts as a cantilever to increase a displacement at the surface of the insulating ground wall relative to the displacement at the underlying stator bar surface. This effect is illustrated in FIG. 10 in which the displacement $d_1$ at the surface 20 of the stator bar 22 is amplified to a greater value $d_2$ at the surface 26 of the insulating ground wall 24. When a strain gauge, such as the strain gauge 8 incorporating the fiber tension structure 12 described with regard to FIGS. 7 and 8, is applied to the insulating ground wall 24, the fiber tension structure prevents the geometric amplification of the ground wall displacement, and thus prevents an accurate measurement of the stator bar displacement. Positioning the strain gauge in or under the insulating ground, i.e., directly on the metal stator bar, would not provide an acceptable solution in that placing any sensor in or under the ground wall would adversely affect the dielectric properties of the ground wall insulation, i.e., would electrically weaken the ground wall insulation.

Accordingly, there is a need for a sensing device that may be applied to a ground wall covering a stator bar to provide an accurate measurement of strain in the underlying stator bar surface.

SUMMARY OF THE INVENTION

In accordance with one aspect of the invention, an optical measurement device is provided for measuring deformation of a surface of a component. The optical measurement device comprises a fiber tension structure including opposing longitudinal end sections and a slot portion located between the longitudinal end sections. An optical fiber is supported on the fiber tension structure, and the optical fiber includes a section defining a Bragg grating located within the slot portion. The fiber tension structure includes a structurally weak area adjacent the slot portion where the fiber tension structure separates to form a gap between the first and second longitudinal end sections.

In accordance with another aspect of the invention, an optical measurement device is provided on a deformable surface of a component. The optical measurement device measures deformation of the deformable surface and comprises a fiber tension structure including opposing longitudinal end sections attached to the deformable surface. An optical fiber is tensioned by the fiber tension structure and includes a section defining a Bragg grating. The fiber tension structure includes a displaceable portion for forming a structural break between the longitudinal end sections where the fiber tension structure separates to form a gap between the first and second longitudinal end sections.

In accordance with a further aspect of the invention, a method of optically measuring deformation of a deformable surface using an optical measurement device is provided. The optical measurement device comprises a fiber tension structure having opposing first and second longitudinal end sections and a slot portion between the longitudinal end sections, and an optical fiber supported on the fiber tension structure and having a section defining a Bragg grating located in the slot portion. The method comprises attaching the fiber tension structure to the deformable surface at least two longitudinally separated points of attachment; and displacing a portion of the fiber tension structure to form a structural discontinuity in the fiber tension structure between the first and second longitudinal ends, while maintaining tension in the optical fiber through the at least two points of attachment.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiment, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

Figure 1:
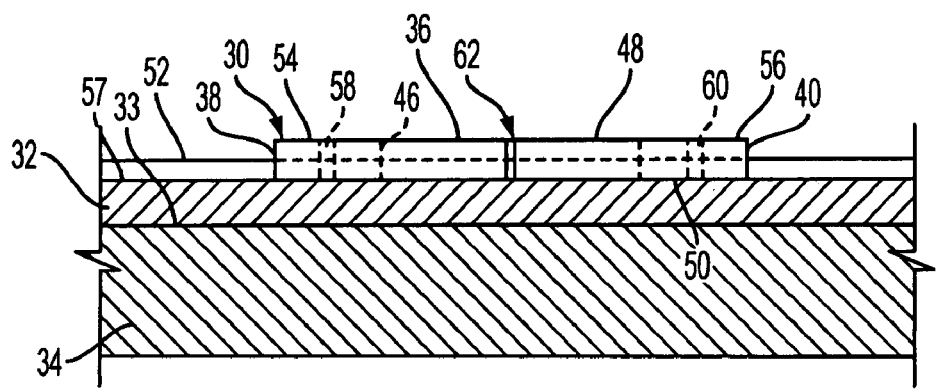
FIG. 1 is a side elevation view in partial cross-section illustrating an optical sensing device constructed in accordance with the present invention.
Figure 2:
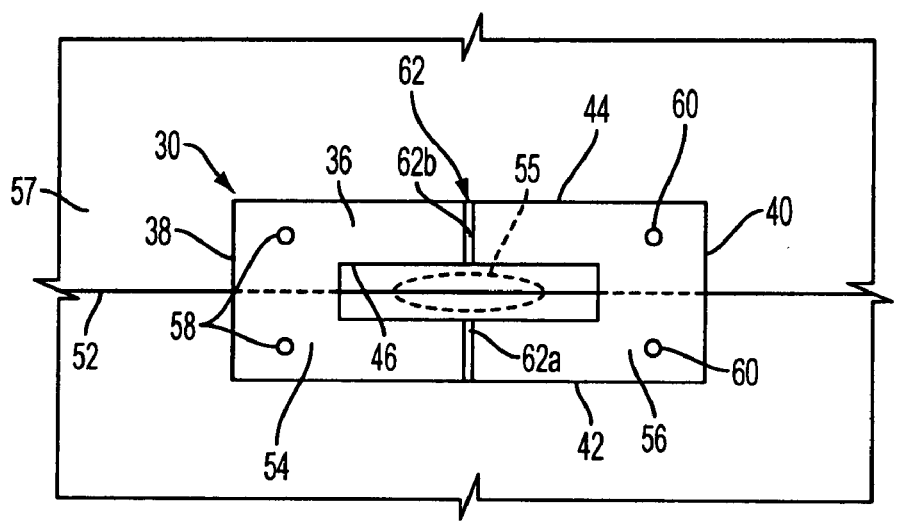
FIG. 2 is a plan view of the optical sensing device illustrated in FIG. 1.

Referring initially to FIGS. 1 and 2, an optical sensing device 30 in accordance with the present invention is illustrated located on a compliant insulating ground wall cover 32 that is provided attached to the surface 33 of a stator bar 34 for a generator (not shown). The stator bar 34 comprises a copper stator bar such as is well known in the art and may comprise any known construction for a stator bar having an insulating ground wall covering. The stator bar 34 and ground wall cover 32 may, for example, be provided in accordance with the teachings of U.S. Pat. No. 6,498,415, which patent is incorporated herein by reference.

The optical sensing device 30 comprises a fiber tensioning structure 36 defining opposing longitudinal ends 38, 40 and longitudinally extending sides 42, 44 to define a generally rectangular thin wafer structure. It should be noted that although the present structure is described as rectangular, the invention disclosed herein is not limited to a particular shape or dimensional configuration. A slot portion 46 is defined as a through hole located generally centrally in the fiber tensioning structure 36, and is illustrated herein as a rectangular window extending between an upper surface 48 and lower surface 50 of the fiber tensioning structure 36. An optical fiber 52 extends through the fiber tensioning structure 36, and is embedded within opposing first and second longitudinal end sections 54, 56 located on either side of the slot portion 46. The optical fiber 52 includes a Bragg grating portion 55 located within the slot portion 46, where a Bragg grating corresponding to a predetermined wavelength is defined within the optical fiber 52.

The fiber tensioning structure 36 is preferably formed of a hard, very brittle material. In the preferred embodiment, the fiber tensioning structure 36 is formed of a ceramic material, such as a high firing temperature ceramic material. For example, the fiber tensioning structure may be formed of Alumina, Zirconia, or Mullite. It should be understood that the present invention is not limited to the material examples given herein, and that other hard brittle materials, including other ceramic materials may be implemented to form the fiber tensioning structure 36.

The optical fiber 52 is held in tension in at least the area of the Bragg grating portion 55, such that the Bragg grating portion 55 is pre-tensioned within the slot portion 46 of the fiber tensioning structure 36. For example, a tension force may be applied to the optical fiber 52 during formation of the fiber tensioning structure 36, such that the optical fiber 52 is embedded within the fiber tensioning structure 36 in a tensioned state. Alternatively, the optical fiber 52 may be attached to a preformed component or components of the fiber tensioning structure 36 and held in a tensioned state by use of an adhesive or other attachment means to immovably locate the ends of the optical fiber 52 on each of the longitudinal end sections 54, 56 and thereby maintain tension within the Bragg grating portion 55.

Each longitudinal end section 54, 56 of the optical sensing device 30 includes at least one location for attaching the longitudinal end section 54, 56 to the surface 57 of the compliant insulating ground wall 32. For example, the fiber tensioning structure 36 may include pairs of apertures 58, 60 at the longitudinal end sections 54, 56, respectively, for receiving an adhesive therethrough to adhere to the ground wall 32.

In addition, the fiber tensioning structure 36 includes a displaceable portion 62 defined by displaceable portions 62a, 62b located on opposing lateral sides of the slot portion 46, at a generally central longitudinal location of the fiber tensioning structure 36. The displaceable portion 62 defines a point of separation between the first and second longitudinal end sections 54, 56, as illustrated by the gap at 64 in FIG. 3. The gap 64 permits the first and second longitudinal end sections 54, 56 to move independently relative to each other. That is, each of the longitudinal end sections 54, 56 may move with the portion of the insulating ground wall 32 to which it is adhered, such that the portions of the optical fiber 52 attached to the respective longitudinal end sections 54, 56 may also move with increasing or decreasing strain transmitted from the stator bar 34 through the ground wall 32.

Figure 3:
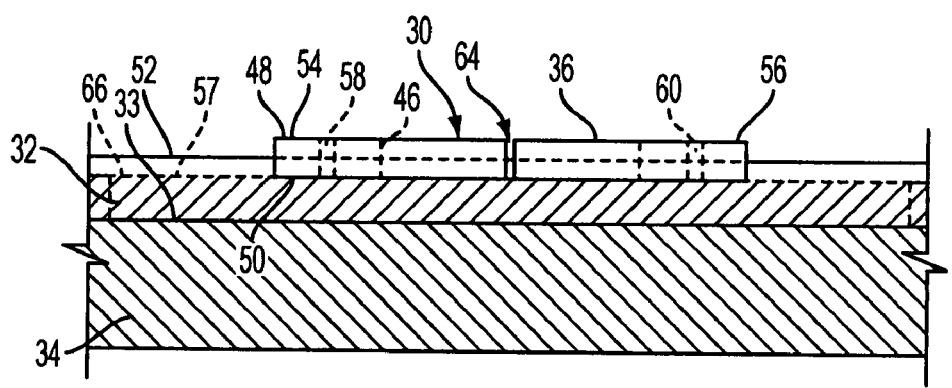
FIG. 3 is a side elevation view in partial cross-section illustrating the optical sensing device of FIG. 1 after opposing longitudinal end sections of the device have been separated.

The displaceable portion 62 in the embodiment of FIGS. 1-3 preferably comprises a frangible portion of the brittle material forming the fiber tensioning structure 36. For example, where the fiber tensioning structure 36 comprises a brittle ceramic, the first and second longitudinal end sections 54, 56 may comprise separately formed halves of the fiber tensioning structure 36 that are joined by an adhesive bond at the displaceable portion 62. The adhesive bond may be formed using a crusty ceramic cement for joining the abutting ends of the longitudinal end sections 54, 56 to define a structurally weak area that may be readily fractured to form the gap 64. The ceramic material provides a structure that is strong under compression, and which can easily support the optical fiber tension, but which can be easily broken at the weak area of the displaceable portion 62 by application of a slight tension force. Further, it should be understood that the displaceable portion 62 illustrated herein is generally representative of any structurally weak area that may be provided between the first and second longitudinal end sections 54, 56. For example, the displaceable portion 62 may represent two or more parallel break lines provided so that a wide section of the fiber tensioning structure 36 is removed to form a wide gap 64 between the longitudinal end sections 54, 56 after separation.

The displaceable portion 62 may be fractured by application of a slight tension to the ground surface 32 in the area in which it supports the fiber tensioning structure 36. For example, a tensile stress for fracturing the displaceable portion 62 may be applied through an initial thermal expansion of the stator bar 34 with the associated movement of the ground wall 32 as the generator is first loaded. The step of fracturing the displaceable portion 62 may also be accomplished manually through application of a force, such as a small controlled impact force delivered from a spring impact center-punch type tool delivering a controlled impact at the location of the displaceable portion 62. Alternatively, the fracture could be accomplished by depositing a few drops of liquid nitrogen to the weakened area of the displaceable portion 62. It should be understood that separation of the longitudinal end sections 54, 56 may be accomplished by any number of techniques and the present invention is not limited by the particular examples provided herein. Further, it should be noted that the temperature rise and thermal expansion of the stator bar 34 will provide an additional clearance between the separated longitudinal sections 54, 56 in all applications, regardless of the method of initially separating the sections 54, 56.

Upon formation of the gap 64, such as through fracture of the displaceable portion 62, the attachment of the separated longitudinal end sections 54, 56 to the ground wall 32 will maintain the position of the longitudinal end sections 54, 56 relative to each other, such that the tension in the optical fiber 52 will also be maintained. However, as noted above, the longitudinal end sections 54, 56 will also be movable relative to each other, such that variations in strain in the stator bar 34 will be transmitted to the optical fiber 52 without interference from the fiber tensioning structure 36. The ground wall 32 is affected by strain in the stator bar 34 through an area generally indicated by the dotted line region 66, which region 66 provides a direct indication of strain at the underlying portion of the stator bar 34. For vibrational movements of the stator bar 34, the strain measurement will be geometrically scaled by the cantilever effect provided by the thickness of the ground wall 32.

Figure 4:
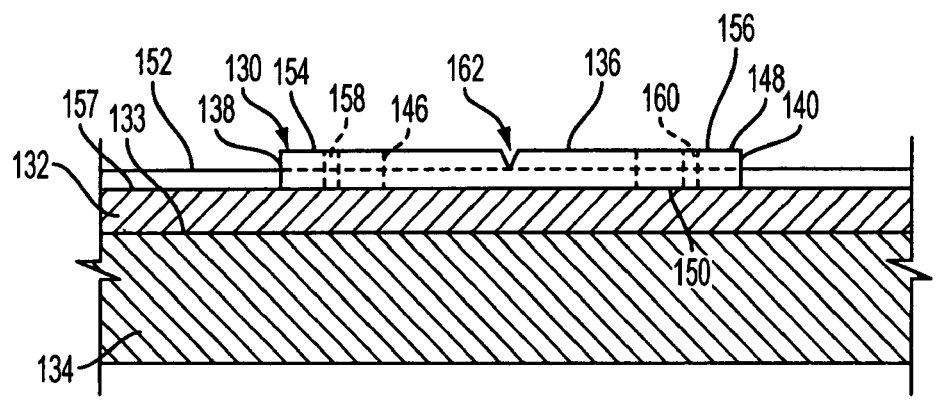
FIG. 4 is a side elevation view in partial cross-section illustrating a second embodiment of an optical sensing device constructed in accordance with the present invention.
Figure 5:
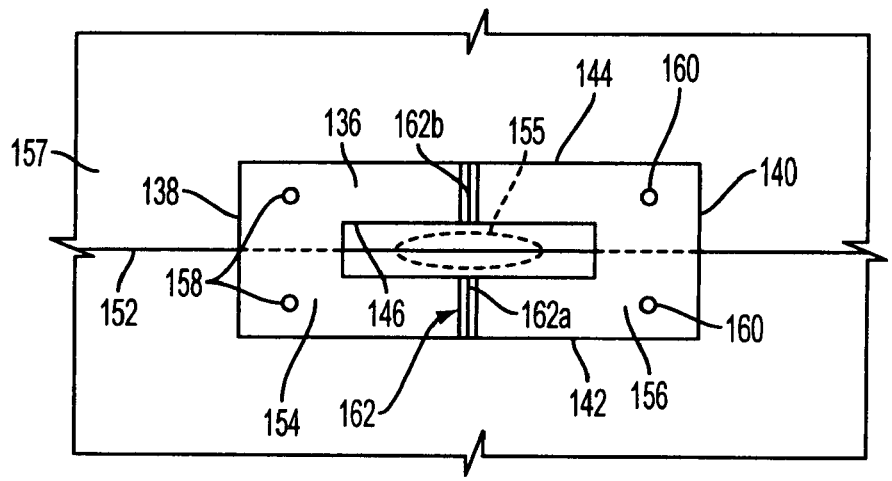
FIG. 5 is a plan view of the optical sensing device illustrated in FIG. 4.
Figure 6:
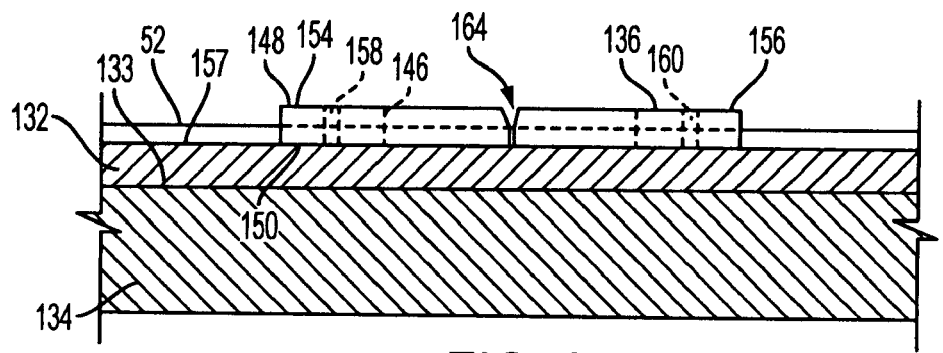
FIG. 6 is a side elevation view in partial cross-section illustrating the optical sensing device of FIG. 4 after opposing longitudinal end sections of the device have been separated.
Figure 7:
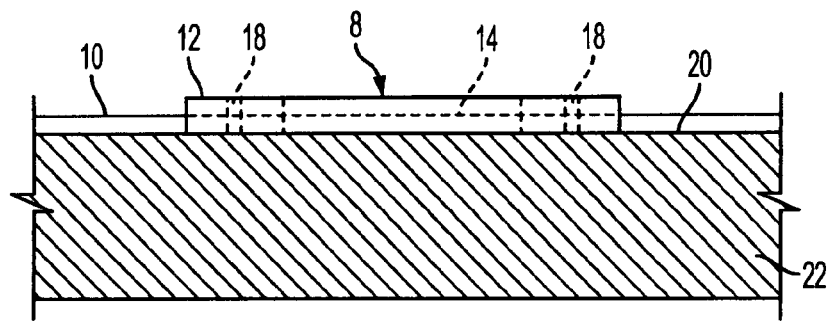
FIG. 7 is a side elevation view in partial cross-section illustrating a prior art optical sensing device.
Figure 8:
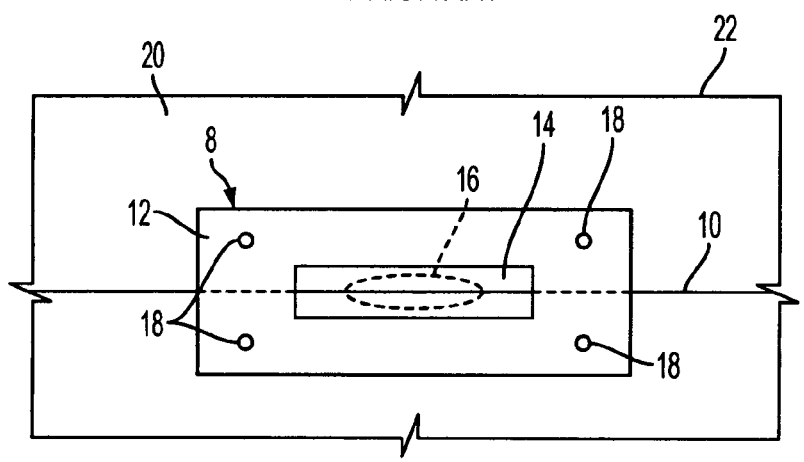
FIG. 8 is a plan view of the prior art optical sensing device illustrated in FIG. 7.
Figure 9:
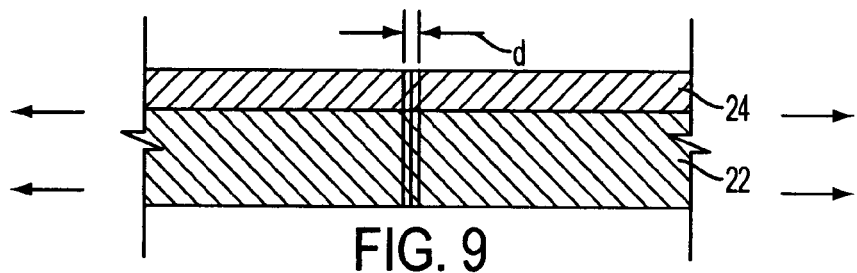
FIG. 9 is a cross-sectional view illustrating displacement of a compliant insulating ground wall with linear expansion of an underlying stator bar.
Figure 10:
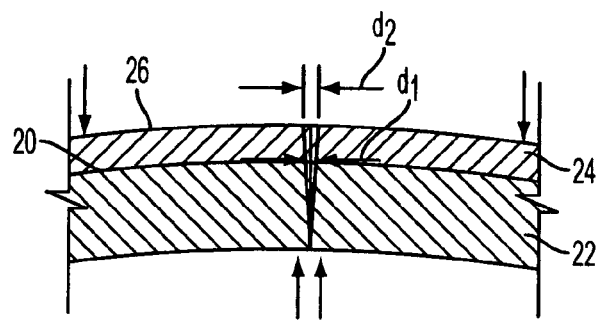
FIG. 10 is a cross-sectional view illustrating displacement of a compliant insulating ground wall with flexing movement of an underlying stator bar.

Referring to FIGS. 4-6, a second embodiment of the invention is illustrated, where elements corresponding to the embodiment of FIGS. 1-3 are labeled with the same reference numeral increased by 100. The optical sensing device 130 of FIGS. 4-6 is illustrated located on a compliant insulating ground wall cover 132 that is provided over a stator bar 134. A fiber tensioning structure 136 of the sensing device 130 is defined by first and second longitudinal end sections 154, 156 located on either side of a slot portion 146, with an optical fiber 152 extending through the slot portion 146 and through the longitudinal end sections 154, 156. The optical fiber 152 includes a Bragg grating portion 155

The fiber tensioning structure 136 of the present embodiment differs from the fiber tensioning structure 36 of the first described embodiment in that a displaceable portion 162 of the fiber tensioning structure 136, forming a structurally weak area for separating the longitudinal end sections 154, 156, is defined by a notched portion of the fiber tensioning structure 136. In the illustrated embodiment, a V-shaped notch is formed extending into the upper surface 148 at the displaceable portions 162a, 162b.

As illustrated in FIG. 6, the fiber tensioning structure 136 may be fractured at the V-shaped notch of the displaceable portion 162 to form a gap 164 for permitting independent movement of the longitudinal end sections 154, 156 and the associated portions of the optical fiber 152 located on either side of the Bragg grating portion 155. The displaceable portion 162 may be fractured by any of the techniques noted above with regard to the description of FIGS. 1-3, or by any other technique that may fracture, tension or otherwise displace the displaceable portion 162.

It should be understood that other structures may be provided for initially placing an optical fiber in tension, attaching the fiber to an underlying structure on opposite sides of a Bragg grating portion, and removing the fiber tensioning structure from tensioning of the fiber to permit the fiber to remain tensioned solely by the underlying structure.

The optical sensing device 30, 130 described herein may be implemented in a conventional manner where light, such as a laser light, is introduced to either or both ends of the optical fiber 52, 152, and an interrogation device, such as a spectrometer, is placed in association with the optical fiber to receive light reflected at the Bragg grating portion 55, 155 to monitor the strain at the location of the optical sensing device 30, 130. A plurality of optical sensing devices 30, 130 may be provided to form a system of optical sensing devices 30, 130 located in series along the length of an optical fiber 52, 152, where the Bragg grating for each individual optical sensing device 30, 130 reflects at a different wavelength, or within a predetermined wavelength range, whereby the strain at different locations along the optical fiber 52, 152 may be identified. For example, in one contemplated system, up to fifty of the optical sensing devices 30, 130 may be provided along the length of the optical fiber 52, 152. An additional Bragg grating may be provided in an unstressed portion of the optical fiber 52, 152 adjacent each of the optical sensing devices 30, 130 to provide a Bragg temperature sensor to compensate for temperature effects at each of the sensor locations. That is, since the Bragg temperature sensor is only affected by thermal expansion of the glass material of the optical fiber 52, 152, provision of the Bragg temperature sensor eliminates the effect of thermal expansion in the measurement provided by the optical sensing device 30, 130. In addition, by providing light and monitoring to both ends of the optical fiber 52, 152, the capability of obtaining a reading from all of the optical sensor devices 30, 130 may be maintained if a break occurs in the optical fiber 52, 152.

The optical sensing device 30, 130 described herein may be utilized in applications other than those including a ground wall. For example, the optical sensing device 30, 130 may be attached directly to the stator bar 34, 134, if such an application is feasible, to provide a strain measurement site. Such an application may be preferable over the known optical strain gauges utilizing a metal fiber tensioning structure, in that it is not necessary to match the coefficient of expansion of the fiber tension structure 36, 136 of the present invention to that of the stator bar 34, 134, as is generally the case with prior art optical strain gauges utilizing a metal tensioning structure. The ceramic structure of the present optical sensing device 30, 130 also eliminates all conductive components previously associated with prior art fiber tensioning structures.

In addition, by providing a sensor that may be applied to the exterior surface of the ground wall to provide an accurate strain measurement, the present optical sensing device 30, 130 may be applied separately from the manufacturing process for the stator bar, and thus maintains the sensor at an accessible location of the structure, permitting variation in installation locations of the sensors and improved access for repair if damage of the sensors occurs.

Also, as noted above, introducing any component having a different dielectric constant, such as a sensor, into a location within or under the insulating ground wall will adversely affect, i.e., will electrically weaken, the groundwall insulation, even if the introduced component is completely nonconductive. The present sensor does not adversely affect the dielectric properties of the insulating ground wall in that it may be positioned on the outer surface of the ground wall.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An optical measurement device for measuring deformation of a surface of a component, said optical measurement device comprising:
   a fiber tension structure including opposing longitudinal end sections and a slot portion located between said longitudinal end sections;
   an optical fiber supported on said fiber tension structure, said optical fiber including a section defining a Bragg grating located within said slot portion, and
   said fiber tension structure including a structurally weak area adjacent said slot portion where said fiber tension structure separates to form a gap between said first and second longitudinal end sections.

2. The optical measurement device of claim 1, wherein said fiber tension structure supports said optical fiber in tension.

3. The optical measurement device of claim 1, including an attachment structure for attaching each of said longitudinal end sections to the surface of a component.

4. The optical measurement device of claim 3, wherein said attachment structure comprises at least one through aperture formed in each of said longitudinal end sections for receiving an adhesive to adhere said surface of said component.

5. The optical measurement device of claim 1, wherein said fiber tension structure comprises a brittle material.

6. The optical measurement device of claim 5, wherein said brittle material comprises a ceramic material.

7. The optical measurement device of claim 6, wherein said structurally weak area comprises a notch formed in a surface of said fiber tension structure.

8. The optical measurement device of claim 6, wherein said structurally weak area is defined by a cemented joint connecting said longitudinal end sections.

9. The optical measurement device of claim 1, wherein said structurally weak area comprises a notch formed in the surface of said fiber tension structure.

10. The optical measurement device of claim 1, wherein said structurally weak area is defined by a cemented joint connecting said longitudinal end sections.

11. An optical measurement device on a deformable surface of a component, said optical measurement device measuring deformation of said deformable surface and comprising:
   a fiber tension structure including opposing longitudinal end sections attached to said deformable surface;
   an optical fiber tensioned by said fiber tension structure, said optical fiber including a section defining a Bragg grating; and
   said fiber tension structure including a displaceable portion for forming a structural break between said longitudinal end sections where said fiber tension structure separates to form a gap between said longitudinal end sections.

12. The optical measurement device of claim 11, wherein said longitudinal end sections are adhesively attached to said deformable surface.

13. The optical measurement device of claim 11, wherein said fiber tension structure comprises a ceramic material and said displaceable portion comprises a structurally weak area.

14. The optical measurement device of claim 13, wherein said structurally weak area comprises at least one of a notch formed in a surface of said fiber tension structure and a cemented joint connecting said longitudinal end sections.

15. The optical measurement device of claim 13, wherein said fiber tension structure includes a slot portion located between said longitudinal end sections, and said Bragg grating is located within said slot portion.

16. The optical measurement device of claim 11, wherein said deformable surface comprises a compliant surface.

17. A method of optically measuring deformation of a deformable surface using an optical measurement device comprising a fiber tension structure having opposing first and second longitudinal end sections and a slot portion between said longitudinal end sections, and an optical fiber supported on said fiber tension structure and having a section defining a Bragg grating located in said slot portion, the method comprising:
   attaching said fiber tension structure to said deformable surface at least two longitudinally separated points of attachment; and
   displacing a portion of said fiber tension structure to form a structural discontinuity in said fiber tension structure between said first and second longitudinal ends, while maintaining tension in said optical fiber through said at least two points of attachment.

18. The method of claim 17, wherein said deformable surface comprises a compliant surface supported on a metal structure.

19. The method of claim 17, wherein said optical fiber is tensioned solely by said deformable surface after said step of displacing a portion of said fiber tension structure.

20. The method of claim 17, wherein said step of displacing a portion of said fiber tension structure comprises fracturing said fiber tension structure to separate said first longitudinal end from said second longitudinal end.

* * * * *